United States Patent
Kim et al.

(10) Patent No.: US 10,326,492 B2
(45) Date of Patent: Jun. 18, 2019

(54) COMMUNICATION METHOD BETWEEN SHORT RANGE RADIO COMMUNICATION DEVICES

(71) Applicants: HYUNDAI MOTOR COMPANY, Seoul (KR); KIA MOTORS CORPORATION, Seoul (KR)

(72) Inventors: Joon Young Kim, Seoul (KR); Ju Won Kim, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/824,677

(22) Filed: Nov. 28, 2017

(65) Prior Publication Data
US 2019/0115949 A1    Apr. 18, 2019

(30) Foreign Application Priority Data

Oct. 13, 2017 (KR) ..................... 10-2017-0133377

(51) Int. Cl.
| | |
|---|---|
| *H04B 1/715* | (2011.01) |
| *H04B 7/26* | (2006.01) |
| *H04W 74/08* | (2009.01) |
| *H04L 25/03* | (2006.01) |
| *H04W 4/80* | (2018.01) |

(52) U.S. Cl.
CPC .......... *H04B 1/715* (2013.01); *H04B 7/2637* (2013.01); *H04L 25/03044* (2013.01); *H04W 74/0866* (2013.01); *H04B 2001/7154* (2013.01); *H04L 2025/03477* (2013.01); *H04W 4/80* (2018.02)

(58) Field of Classification Search
CPC .............. H04B 1/715; H04B 7/2637; H04B 2001/7154; H04L 25/03044; H04L 2025/03477; H04W 74/0866; H04W 4/80
See application file for complete search history.

(56) References Cited

U.S. PATENT DOCUMENTS

| | | | |
|---|---|---|---|
| 7,773,660 B2 | 8/2010 | Schmandt et al. | |
| 8,363,693 B2 * | 1/2013 | Fujiwara | H04B 1/7143 375/131 |

(Continued)

FOREIGN PATENT DOCUMENTS

| | | |
|---|---|---|
| KR | 10-0994285 B1 | 11/2010 |
| KR | 10-1052969 B1 | 7/2011 |

*Primary Examiner* — Freshteh N Aghdam
(74) *Attorney, Agent, or Firm* — Morgan, Lewis & Bockius LLP

(57) ABSTRACT

A communication method between short range radio communication devices includes sharing multiple pieces of link information of multiple devices by the multiple devices making communication with each other through a frequency hopping scheme under a short range radio communication environment, such that the multiple devices communicate with each other without interference with each other even if mutually independently making communication, creating, by the multiple devices, multiple pieces of frequency slot allocation information based on the multiple pieces of link information and broadcasting the multiple pieces of created frequency slot allocation information, and making, by the multiple devices, first communication based on specific frequency slot allocation information among multiple pieces of received frequency slot allocation information.

19 Claims, 6 Drawing Sheets

(56) References Cited

U.S. PATENT DOCUMENTS

| | | | |
|---|---|---|---|
| 2002/0080855 A1* | 6/2002 | Watanabe | H04B 1/7143 375/132 |
| 2004/0137849 A1* | 7/2004 | Kloper | H04B 1/715 455/67.11 |
| 2004/0240526 A1* | 12/2004 | Schmandt | H04B 1/715 375/135 |
| 2006/0014506 A1* | 1/2006 | Haartsen | H04B 17/318 455/227 |
| 2008/0107217 A1 | 5/2008 | Vrcelj et al. | |
| 2008/0267126 A1 | 10/2008 | Vujcic et al. | |
| 2010/0120362 A1* | 5/2010 | Walley | H04W 16/14 455/41.2 |
| 2010/0220821 A1 | 9/2010 | Vrcelj et al. | |
| 2011/0305232 A1* | 12/2011 | Singamsetty | H04B 1/7143 370/338 |
| 2012/0257508 A1* | 10/2012 | Reunamaki | H04W 4/80 370/241 |
| 2016/0157078 A1* | 6/2016 | Palin | H04W 8/005 455/41.2 |
| 2018/0048350 A1* | 2/2018 | Hammerschmidt | H04B 1/713 |

* cited by examiner

COMMUNICATION METHOD BETWEEN SHORT RANGE RADIO COMMUNICATION DEVICES

CROSS-REFERENCE TO RELATED APPLICATION

This application claims the benefit of priority to Korean Patent Application No. 10-2017-0133377, filed on Oct. 13, 2017 in the Korean Intellectual Property Office, the disclosure of which is incorporated herein in its entirety by reference.

TECHNICAL FIELD

The present disclosure relates to a communication method between short range radio communication devices, and more particularly, to a technology enabling multiple devices to communicate with each other based on a frequency hopping scheme without interfering with each other under a short range radio communication environment.

BACKGROUND

A Bluetooth radio system employs an Industrial Scientific and Medical (ISM) frequency band of 2400-2483.5 MHz. To avoid interference with other systems employing higher and lower frequency bands than the frequency band, the Bluetooth radio system uses the frequency band of 2402-2480 MHz without 2 MHz after 2400 MHz and 3.5 MHz before 2483.5 MHz, that is, uses 79 channels in total. The ISM refers to the frequency band allocated for industrial, scientific, or medical purposes. Since the ISM needs not to be permitted for the use of a radio wave, the ISM has been mainly used for personal radio devices to emit lower-power radio waves. For example, an amateur radio, a wireless local area network (LAN), or Bluetooth employs the ISM band.

Since several systems use the same radio band, radio wave interference may occur between systems. In order to prevent the radio wave interference, the Bluetooth employs a frequency hopping scheme. The frequency hopping scheme is a scheme to transmit a slight amount of packet (data) while rapidly moving many channels in a specific pattern. In the case of Bluetooth, the allocated 79 channels are hopped 1600 times per second.

Only when Bluetooth devices are synchronized with each other with respect to the hopping pattern, the Bluetooth devices may make communication with each other. In general, the Bluetooth devices are connected with each other while forming the relation of a master and slaves therebetween. If a master device fails to be synchronized with a slave device with respect to a frequency hopping pattern created by the master device, the communication between the master device and the slave device may not be made. Accordingly, when the master device and the slave device are synchronized with each other with respect to the frequency hopping pattern created by the master device, the master device and the slave device may be stably connected with each other while avoiding radio wave interference with other systems. For reference, one master device may be connected with up to 7 slave devices. The communication between the master device and the slave device is possible, but the communication between the slave devices is impossible.

Regarding conventional communication methods between short range radio communication devices, multiple devices may interfere with each other when the multiple devices mutually independently make communication.

For example, an audio video navigation (AVN) device, which is able to make short range radio communication, may make communication (first communication) with a first short range radio communication device and a second short range radio communication device, and a third short range radio communication device may make communication (second communication) with a fourth short range radio communication device. In this case, even though the first communication and the second communication employ the same frequency band, since the first communication and the second communication are mutually independent from each other, agreement may not made on the allocation of frequency slots. Accordingly, the first communication may interfere with the second communication.

SUMMARY

The present disclosure has been made to solve the above-mentioned problems occurring in the prior art while advantages achieved by the prior art are maintained intact.

An aspect of the present disclosure provides a communication method between short range radio communication devices, enabling multiple devices, which make communication through a frequency hopping scheme under a short range radio communication environment, to create and broadcast multiple pieces of frequency slot allocation information, respectively, to make communication based on frequency slot allocation information, which is first created among the multiple pieces of frequency slot allocation information, and to make communication without the interference therebetween even if the multiple devices mutually independently make communication.

The technical problems to be solved by the present disclosure are not limited to the aforementioned problems, and any other technical problems not mentioned herein will be clearly understood from the following description by those skilled in the art to which the present disclosure pertains. In addition, objects and advantages of the present disclosure are realized by units set forth in claims and the combination thereof.

According to an aspect of the present disclosure, a communication method between short range radio communication devices include sharing multiple pieces of link information of multiple devices, by the multiple devices making communication with each other through a frequency hopping scheme under a short range radio communication environment, creating multiple pieces of frequency slot allocation information based on the multiple pieces of link information and broadcasting the multiple pieces of created frequency slot allocation information, by the multiple devices, and making, by the multiple devices, first communication based on specific frequency slot allocation information among multiple pieces of received frequency slot allocation information.

In this case, the creating of the multiple pieces of frequency slot allocation information includes equally distributing, by the multiple devices, frequency slots in random sequence.

In addition, the frequency slot allocation information may include information on time at which the frequency slot allocation information is created. In this case, the making of second communication may include selecting frequency slot allocation information, which represents earliest time information, among the multiple pieces of received frequency slot allocation information, by the multiple devices, agreeing, by the multiple devices, on use of the selected frequency slot allocation information, and making, by the multiple devices, communication based on the selected frequency slot allocation information.

Further, the frequency slot allocation information may include information on time at which the frequency slot allocation information is broadcasted. In this case, the making of the first communication may include selecting, by the multiple devices, frequency slot allocation information, which represents earliest time information among the multiple pieces of received frequency slot allocation information, agreeing, by the multiple devices, on use of the selected frequency slot allocation information, and making, by the multiple devices, communication based on the selected frequency slot allocation information.

In addition, the specific frequency slot allocation information may include information representing valid time of the specific frequency slot allocation information. A device, which has created the specific frequency slot allocation information, re-creates frequency slot allocation information, if the valid time elapses after the first communication is made. In this case, the re-creating of the frequency slot allocation information may include sharing, by remaining devices, multiple pieces of link information of the remaining devices, re-creating and broadcasting multiple pieces of frequency slot allocation information, and making communication based on specific frequency slot allocation information among the multiple pieces of re-created frequency slot allocation information, if the device, which has created the specific frequency slot information, deviates from a coverage area for short range radio communication.

In addition, the communication method may include, after the first communication is made, determining a type of interference caused by a device (first device), which is located closest to a heterogeneous short range radio communication device, among the multiple devices as the heterogeneous short range radio communication device approaches; broadcasting, by the first device, a signal, which is used for instructing exchange of link information, to devices surrounding the first device, re-creating and broadcasting, by the multiple devices, multiple pieces of frequency slot allocation information, and making, by the multiple devices, the second communication based on specific frequency slot allocation information among the multiple pieces of re-created frequency slot allocation information, if a wide band interference is caused; and broadcasting, by the first device, a signal, which is used for instructing use of a signal estimator, to the surrounding devices and determining, by the multiple devices, whether to use a frequency band having a narrow band interference by using the signal estimator, if the narrow band interference is caused.

In this case, the determining of the type of the interference may include determining the wide band interference to be caused if the interference occurs beyond a reference frequency band; and determining the narrow band interference to be caused if the interference occurs within the reference frequency band.

In addition, the signal, which is used for instructing the exchange of the link information, may include information on a frequency band having an interference caused by the heterogeneous short range radio communication device. In this case, the making of the second communication may include re-creating, by the multiple devices, the frequency slot allocation information while avoiding the frequency band having the interference.

Further, the determining of the type of the interference may include calculating an Allan variance value of an interference signal, prohibiting the use of the frequency band having the narrow band interference if the calculated Allan variance value exceeds a threshold value, and allowing the use of the frequency band having the narrow band interference if the Allan variance value does not exceed the threshold value. If the calculated Allan variance value exceeds the threshold value for a reference period of time, the second communication may be made.

In addition, the frequency slot allocation information may include information on time at which the frequency slot allocation information is re-created.

In this case, the making of the second communication may include selecting, by the multiple devices, frequency slot allocation information, which represents earliest time information, among the multiple pieces of re-created frequency slot allocation information, agreeing on use of the selected frequency slot allocation information by the multiple devices, and making, by the multiple devices, communication based on the selected frequency slot allocation information.

Further, the frequency slot allocation information may include information on time at which the frequency slot allocation information is broadcasted. In this case, the making of the second communication may include selecting, by the multiple devices, frequency slot allocation information, which represents earliest time information, among the multiple pieces of re-created frequency slot allocation information; agreeing on use of the selected frequency slot allocation information by the multiple devices; and making, by the multiple devices, communication based on the selected frequency slot allocation information.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
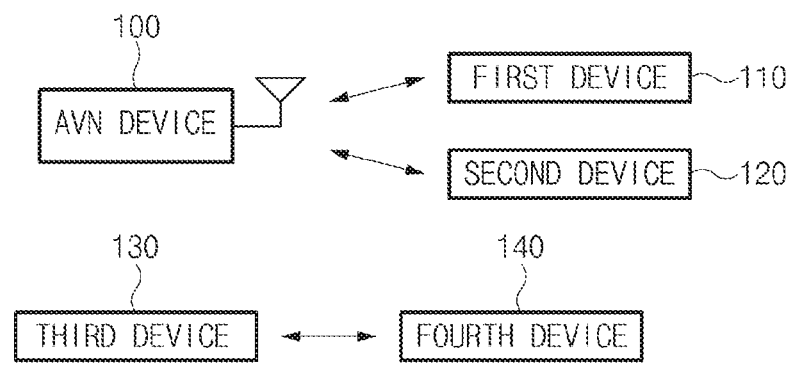
FIG. 1 is a view illustrating a short range radio communication environment to which the an exemplary embodiment of the present disclosure is applied.

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the subject matter of the present disclosure.

In describing elements of exemplary embodiments of the present disclosure, the terms 1st, 2nd, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a short range radio communication environment to which an exemplary embodiment of the present disclosure is applied. The number of devices does not affect the subject matter of the present disclosure.

As illustrated in FIG. 1, the short range radio communication environment to which the present exemplary embodiment is applied includes an AVN device 100, a first device 110, a second device 120, a third device 130, and a fourth device 140. The above elements make communication with each other through a frequency hopping scheme.

In this case, the AVN device 100 may make multiplex communication with multiple devices through a short range radio communication scheme. For example, the AVN device 100 may make multiplex communication (hereinafter, referred to as "first communication") with the first device 110 and the second device 120.

The first device 110 may include various audio devices that are able to make short range radio communication.

The second device 120 may include various sensors that are able to make short range radio communication.

The third device 130 may include various mobile devices (e.g., smartphone, and the like) that are able to make short range radio communication. For example, the third device 130 may make communication (hereinafter, referred to as "second communication") with the fourth device 140.

The fourth device 140 may include an audio receiving device (a headset, a speaker, or the like) that is able to make short range radio communication.

In the case that the AVN device 100 makes communication with the first to fourth devices 110, 120, 130, and 140 under the short range radio communication environment, interference is not caused. However, in the case that the first communication and the second communication are made, interference is caused between the first communication and the second communication. This is because the agreement is not made on frequency slot allocation in advance. If an exemplary embodiment of the present disclosure is applied, the interference is not caused between the first communication and the second communication.

Hereinafter, the operations of the AVN device 100 and the first to fourth devices 110 to 140 will be described in the case that the exemplary embodiment of the present disclosure is applied.

The AVN device 100 and the first to fourth devices 110 to 140 exchange and share their link information together. In this case, when receiving a signal containing the link information, the AVN device 100 and the first to fourth devices 110 to 140 determine, based on the strength of the received signal, whether communication is enable. In this case, it is assumed that all devices are located in a coverage area (hereinafter briefly referred to as "coverage area") for short range radio communication.

Accordingly, the AVN device 100 may acquire link information of the first device 110, the link information of the second device 120, the link information of the third device 130, and the link information of the fourth device 140. Accordingly, the first device 110 may acquire the link information of the AVN device 100, the link information of the second device 120, the link information of the third device 130, and the link information of the fourth device 140. In addition, the second device 120 may acquire the link information of the AVN device 100, the link information of the first device 110, the link information of the third device 130, and the link information of the fourth device 140. In addition, the third device 130 may acquire the link information of the AVN device 100, the link information of the first device 110, the link information of the second device 120, and the link information of the fourth device 140. In addition, the fourth device 140 may acquire the link information of the AVN device 100, the link information of the first device 110, the link information of the second device 120, and the link information of the third device 130.

As described above, all devices (e.g., the AVN device 100 and the first to fourth devices 110, 120, 130, and 140) located in the coverage area allocate respective frequency slots and broadcast the allocation results (frequency slot allocation information) to surrounding devices. In this case, although the frequency slot allocation scheme is randomly performed, it is preferred that frequency slots are equally allocated to all devices (e.g., the AVN device 100 and the first to fourth devices 110, 120, 130, and 140). In addition, the frequency slot allocation information has creation time thereof.

Accordingly, the AVN device 100 broadcasts the frequency slot allocation information created by the AVN device 100 to the first to fourth devices 110 to 140.

In addition, the first device 110 broadcasts the frequency slot allocation information created by the first device 110 to the AVN device 100 and the second to fourth devices 120 to 140.

In addition, the second device 120 broadcasts the frequency slot allocation information created by the second device 120 to the AVN device 100 and the first device 110, the third device 130, and the fourth device 140.

In addition, the third device 130 broadcasts the frequency slot allocation information created by the third device 130 to the AVN device 100 and the first device 110, the second device 120, and the fourth device 140.

In addition, the fourth device 140 broadcasts the frequency slot allocation information created by the fourth device 140 to the AVN device 100 and the first device 110, the second device 120, and the third device 130.

In this case, since the AVN device 100 and the first to fourth devices 110, 120, 130, and 140 represent different performance, different time is taken when the AVN device 100 and the first to fourth devices 110, 120, 130, and 140 create relevant frequency slot allocation information. Accordingly, time to create the frequency slot allocation information is varied. Accordingly, different time is taken to transmit the frequency slot allocation information to a surrounding device.

Each of the AVN device 100 and the first to fourth devices 110, 120, 130, and 140 selects frequency slot allocation information, which is first created among multiple pieces of frequency slot allocation information received therein, and notifies the agreement on the selected frequency slot allocation information to a device which has created the selected frequency slot allocation information (handshake). In this case, frequency slot allocation information, which is first broadcasted, may be selected.

For example, if the frequency slot allocation information created by the third device 130 is selected, the third device 130 receives the agreement on the selected frequency slot allocation information from the AVN device 100, the first device 110, the second device 120, and the fourth device 140

Figure 2:
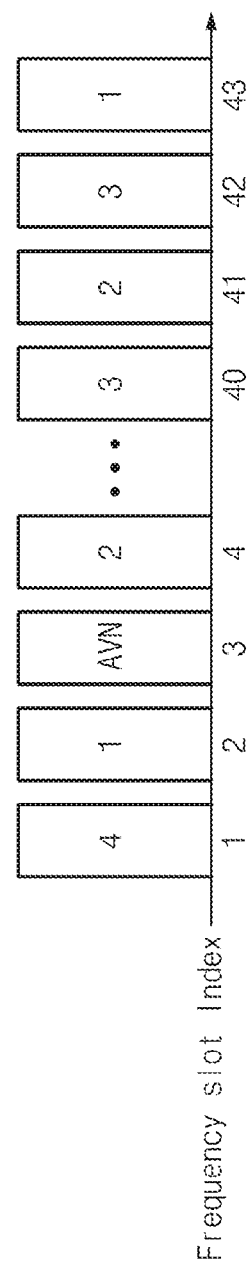
FIG. 2 is a view illustrating frequency slot allocation information, according to an exemplary embodiment of the present disclosure.

In this case, the selected frequency slot information is illustrated in FIG. 2 by way of an example.

In FIG. 2, an available frequency band is divided into 43 slots, and each frequency slot is allocated to each of the AVN device 100 and the first to fourth devices 110 to 140. In this case, even though the allocation sequence is made randomly, the slots may be allocated to the AVN device 100 and the first to fourth devices 110 to 140 as equally as possible. Since each of the AVN device 100 and the first to fourth devices 110 to 140 makes communication in a frequency slot allocated thereto, an amount of transceived data is determined depending on the number of allocated frequency slots.

Meanwhile, the frequency slot allocation information may further include valid time information thereof. In this case, the valid time information represents valid time of the frequency slot allocation information.

Accordingly, all devices (e.g., the AVN device 100 and the first to fourth devices 110 to 140) use frequency slot allocation information within the valid time. If the valid time elapses, the device, which has created the frequency slot allocation information, may re-allocate a frequency slot. In this case, if the device, which has created the frequency slot allocation information, deviates from the coverage area, the device performs a frequency slot allocation process from an initial stage again. In this case, if new frequency slot allocation information is not transmitted from the device, which has created the frequency slot allocation information, within a specific period of time, the device is recognized as deviating from the coverage area.

Meanwhile, if a heterogeneous short range radio communication device (e.g., a Zigbee sensor) approaches while the AVN device 100 and the first to fourth devices 110 to 140 are making communication based on the selected frequency slot allocation information, a device, which has the greatest influence by the heterogeneous short range radio communication device, that is, is located closest to the heterogeneous short range radio communication device to first detect the heterogeneous short range radio communication device, determines whether the interference caused by the heterogeneous short range radio communication device is wide band interference or narrow band interference. If the interference is caused beyond reference frequency band (e.g., the frequency band of 3 MHz), the device determines the interference as the wide band interference. If the interference is caused within the reference band, the device determines the interference as the narrow band interference.

If the interference is the wide band interference, the device, which first detects the heterogeneous short range radio communication device, broadcasts a signal (message), which is used for instructing the exchange of link information to surrounding devices. The signal, which is used for instructing the exchange of the link information, includes information (hereinafter, referred to as "interference frequency band information") on a frequency band having an interference caused by the heterogeneous short range radio communication device.

The reason why the signal, which is used for instructing the exchange of the link information, is broadcasted is to allow the AVN device 100 and the first to fourth devices 110 to 140 to equally transmit data while avoiding the frequency band having the interference (hereinafter, referred to as "interference frequency band"). In other words, the AVN device 100 and the first to fourth devices 110 to 140 create the frequency slot allocation information while avoiding the interference frequency band and make communication based on frequency slot information, which is first created or broadcasted.

If the interference is the narrow band interference, the device, which first detect the heterogeneous short range radio communication device, broadcasts a signal (message) for instructing the use of a signal estimator to surrounding devices. In addition, even the device, which first detects the heterogeneous short range radio communication device, uses the signal estimator. In this case, the signal for instructing the exchange of the link information includes the interference frequency band information.

The signal estimator is a module included in each of the AVN device 100 and the first to fourth devices 110 to 140 to determine, periodically or in real time, whether to use a frequency band having the narrow band interference.

The signal estimator may estimate a signal in various manners such as an adaptive filter, energy detection, hidden Markov chain, Allan variance, and the like.

For example, the signal estimator may estimate a signal by using an Allan variable. The signal estimator calculates an Allan variance value of an interference signal, prohibits the use of the frequency band having the narrow band interference if the calculated Allan variance value exceeds a threshold value. If the calculated Allan variance value does not exceed the threshold value, the signal estimator allows the use of the frequency band having the narrow band interference. In this case, the signal estimator may measure noise power on a spectrum, may calculate Allan variance values by using the noise power, and then may set the minimum value of the calculated Allan variance values as the threshold value.

Meanwhile, the device, which first detects the heterogeneous short range radio communication device, may broadcast a signal (message), which is used for instructing the exchange of link information, to the surrounding devices, similarly to the case of the wide band interference, if the Allan variance value periodically calculated by the signal estimator exceeds the threshold value for a reference period of time. This is to solve the problem related to fairness as the device, which first detects the short range radio communication device, does not use the frequency band having the narrow band interference and thus the number of available frequency slots is reduced as compared with those of the surrounding devices.

Figure 3:
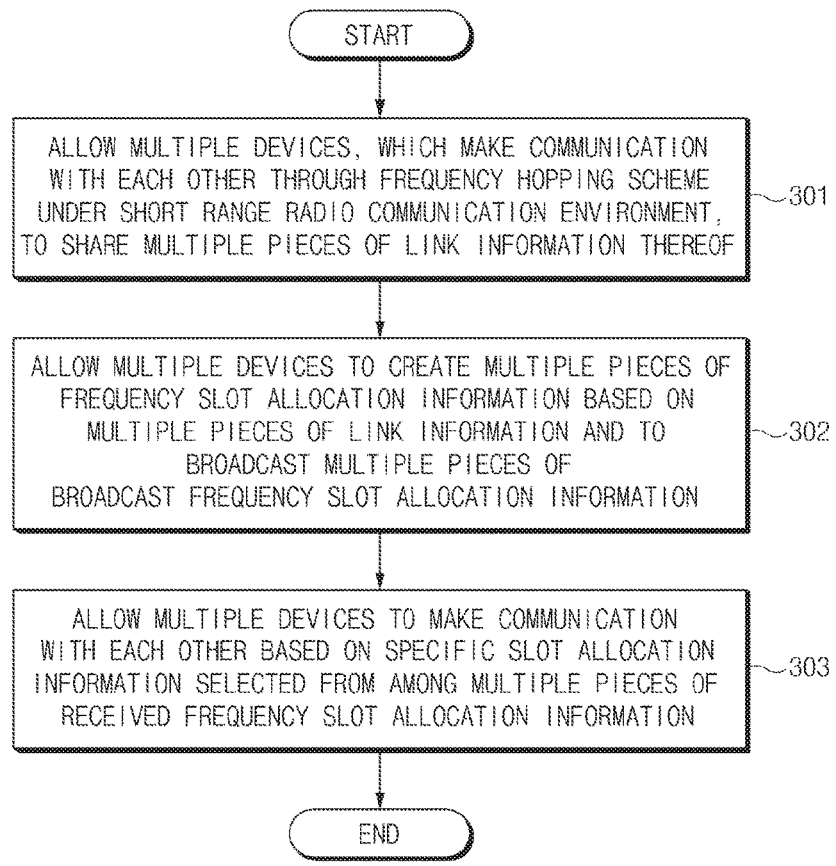
FIG. 3 is a flowchart illustrating a communication method between short range radio communication devices, according to the exemplary embodiment of the present disclosure.

FIG. 3 is a flowchart illustrating a communication method between short range radio communication devices, according to the present exemplary embodiment.

First, multiple devices, which communicate with each other based on a frequency hopping scheme under the short range radio communication environment, share link information of the multiple devices together (301). In this case, the short range radio communication may include Bluetooth communication, Infrared (IR) communication, Zigbee communication, or the like.

Thereafter, the multiple devices create frequency slot allocation information based on the shared link information and broadcast the frequency slot allocation information (302). In other words, each device allocates frequency slots in random sequence based on acquired link information such that the frequency slots are equally distributed.

Thereafter, the devices communicate based on specific frequency slot information among multiple pieces of frequency slot allocation information received therein (303). In this case, the specific frequency slot allocation information may be frequency slot allocation information which is first created or broadcasted among the multiple pieces of received frequency slot allocation information.

Figure 4:
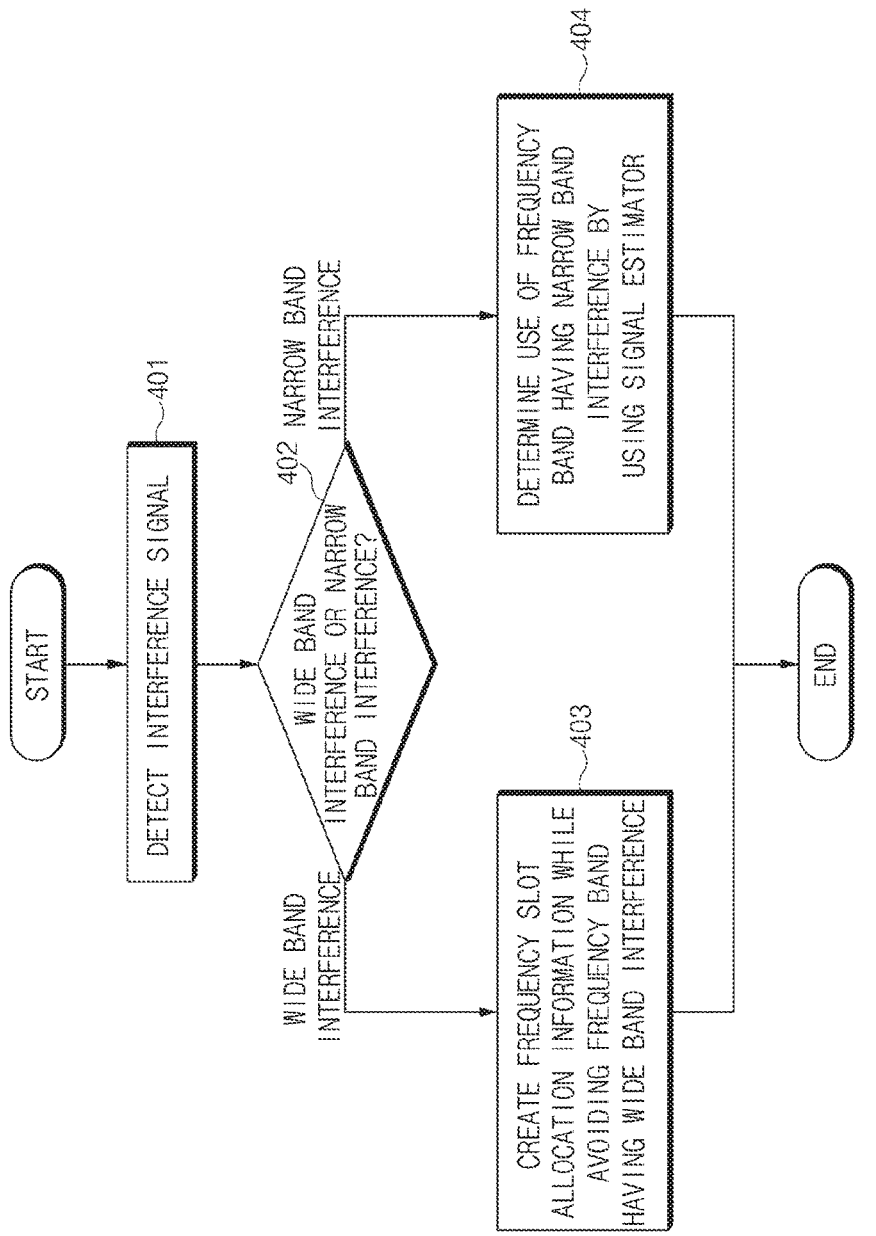
FIG. 4 is a flowchart illustrating a process of coping with the interference caused by a heterogeneous short range radio communication device in the communication method between the short range radio communication devices, according to the exemplary embodiment of the present disclosure.

FIG. 4 is a flowchart illustrating a process of coping with the interference caused by the heterogeneous short range radio communication device in the communication method between the short range radio communication devices, according to the present exemplary embodiment.

First, if a heterogeneous short range radio communication device (e.g., a Zigbee sensor) approaches, a device (e.g., the third device 130), which is located closest to the heterogeneous short range radio communication device among multiple devices (e.g., the AVN device 100 and the first to fourth devices 110 to 140), first detects the heterogeneous short range radio communication device.

Thereafter, the third device 130 detects an interference signal generated by the heterogeneous short range radio communication device (401). In this case, since the heterogeneous short range radio communication device uses the frequency band of 2.4 GHz, the heterogeneous short range radio communication device causes interference.

Thereafter, the third device 130 determines, based on the detected interference signal, whether the interference is wide band interference or narrow band interference (402). In other words, if the interference is caused beyond the reference band (e.g., the frequency band of 3 MHz), the device determines the interference as the wide band interference. If the interference is caused within the reference band, the device determines the interference as the narrow band interference.

The third device 130 broadcasts a signal (message), which is used for instructing the exchange of link information, to the AVN device 100 and the first, second, and fourth devices 110, 120, and 140 surrounding the third device 130, if the interference is the wide band interference as the result of the determination in operation 402. In addition, the signal for instructing the exchange of the link information includes information on a frequency band having the interference caused by the heterogeneous short range radio communication device.

In other words, if the exchange of the link information is completed, the AVN device 100 and the first to fourth devices 110, 120, 130, and 140 create frequency slot allocation information while avoiding the frequency band having the interference and communicate based on frequency slot information, which is first created or broadcasted (403).

If the interference is the narrow band interference as the result of the determination in operation 402, the third device 130 broadcasts a signal (message) for instructing the use of the signal estimator to the AVN device 100 and the first, second, and fourth devices 110, 120, and 140 surrounding the third device 130, In this case, the signal for instructing the exchange of the link information includes information on the interference frequency band information. In addition, even the third device 130 uses the signal estimator.

Signal estimators is included in all devices (e.g., the AVN device 100 and the first to fourth devices 110, 120, 130, and 140) to determine, periodically or in real time, whether to use the frequency band having the narrow band interference.

Accordingly, if the narrow band interference is caused, all devices (e.g., the AVN device 100 and the first to fourth devices 110, 120, 130, and 140) determine whether to use the frequency slot having the narrow band interference, through the signal estimators. In other words, if the frequency slot having the narrow band interference is available, communication is made through the frequency slot having the narrow band interference. If the frequency slot having the narrow band interference is not available, communication is not made through the frequency slot having the narrow band interference.

Figure 5:
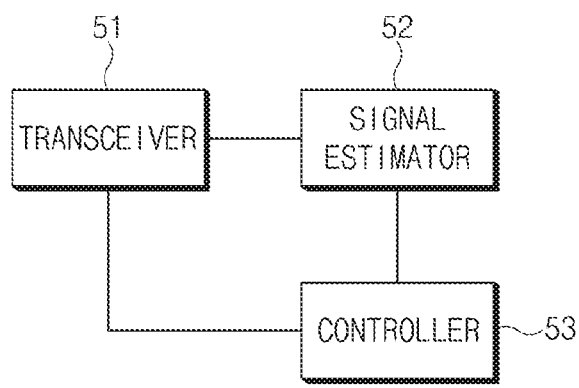
FIG. 5 is a block diagram illustrating the configuration of a short range radio communication device, according to an exemplary embodiment of the present disclosure.

FIG. 5 is a block diagram illustrating the configuration of a short range radio communication device, according to an exemplary embodiment of the present disclosure.

As illustrated in FIG. 5, according to the present exemplary embodiment, the short range radio communication device includes a transceiver 51, a signal estimator 52, and a controller 53.

Regarding the above elements, the transceiver 51 serves as a module which provides a short range radio communication interface and communicates with another short range radio communication device to transceive various information. The transceiver 51 may include a radio frequency (RF) tuner.

The signal estimator 52 may estimate a signal in various manners such as an adaptive filter, energy detection, hidden Markov chain, Allan variance, and the like.

For example, the signal estimator 52 may estimate a signal by using an Allan variable. The signal estimator 52 calculates an Allan variance value of the interference signal, prohibits the use of the frequency band having the narrow band interference if the calculated Allan variance value exceeds a threshold value. If the calculated Allan variance value does not exceed the threshold value, the signal estimator 52 allows the use of the frequency band having the narrow band interference.

The signal estimator 52 may be used in the case that the narrow band interference is caused.

The controller 53 performs the overall control such that the elements normally perform the inherent functions thereof.

The controller 53 allocates a frequency slot based on link information received from another short range radio communication device through the transceiver 51. In this case, the controller 53 allocates frequency slots to all short range radio communication devices (e.g., the AVN device 100 and the first to fourth devices 110, 120, 130, and 140) such that all short range radio communication devices (e.g., the AVN device 100 and the first to fourth devices 110, 120, 130, and 140), which are located in the coverage area, may communicate. In this case, the controller 53 equally distributes the frequency slots such that all short range radio communication devices (e.g., the AVN device 100 and the first to fourth devices 110, 120, 130, and 140) equally make communication although the sequence of allocating the frequency slots is randomly determined. The example thereof is illustrated in FIG. 2.

In addition, the controller 53 detects an interference signal generated from a heterogeneous short range radio communication device, if the heterogeneous short range radio communication device (e.g., a Zigbee sensor) approaches, and determines, based on the detected interference signal, whether the wide band interference or the narrow band interference is caused. In other words, if the interference is caused beyond the reference band (e.g., the frequency band of 3 MHz), the controller 53 determines the interference as the wide band interference. If the interference is not caused beyond the reference band, the device determines the interference as the narrow band interference.

In addition, the controller 53 broadcasts a signal (message) for instructing the exchange of link information to a surrounding short range radio communication device if the interference is the wide band interference. In addition, the signal for instructing the exchange of the link information includes information on a frequency band having the interference caused by the heterogeneous short range radio communication device. Thereafter, if the exchange of the link information is completed, all short range radio communication devices (e.g., the AVN device 100 and the first to fourth devices 110, 120, 130, and 140) create the frequency slot allocation information while avoiding the frequency band having the interference and communicate based on frequency slot information, which is first created or broadcasted.

In addition, if the narrow band interference is caused, the controller 53 broadcasts a signal (message) for instructing the use of the signal estimator 52 to a surrounding short range radio communication device. In this case, the signal for instructing the exchange of the link information includes information on the frequency band having interference.

In addition, if the narrow band interference is caused, the controller 53 determines, through the signal estimator 52, whether to use the frequency slot having the narrow band interference. In other words, if the frequency slot having the narrow band interference is available, communication is made through the frequency slot having the narrow band interference. If the frequency slot having the narrow band interference is not available, communication is not made through the frequency slot having the narrow band interference.

Although the signal estimator 52 has been described as being implemented in the form of a separate element, the controller 53 may be implemented to perform the function of the signal estimator 52.

Figure 6:
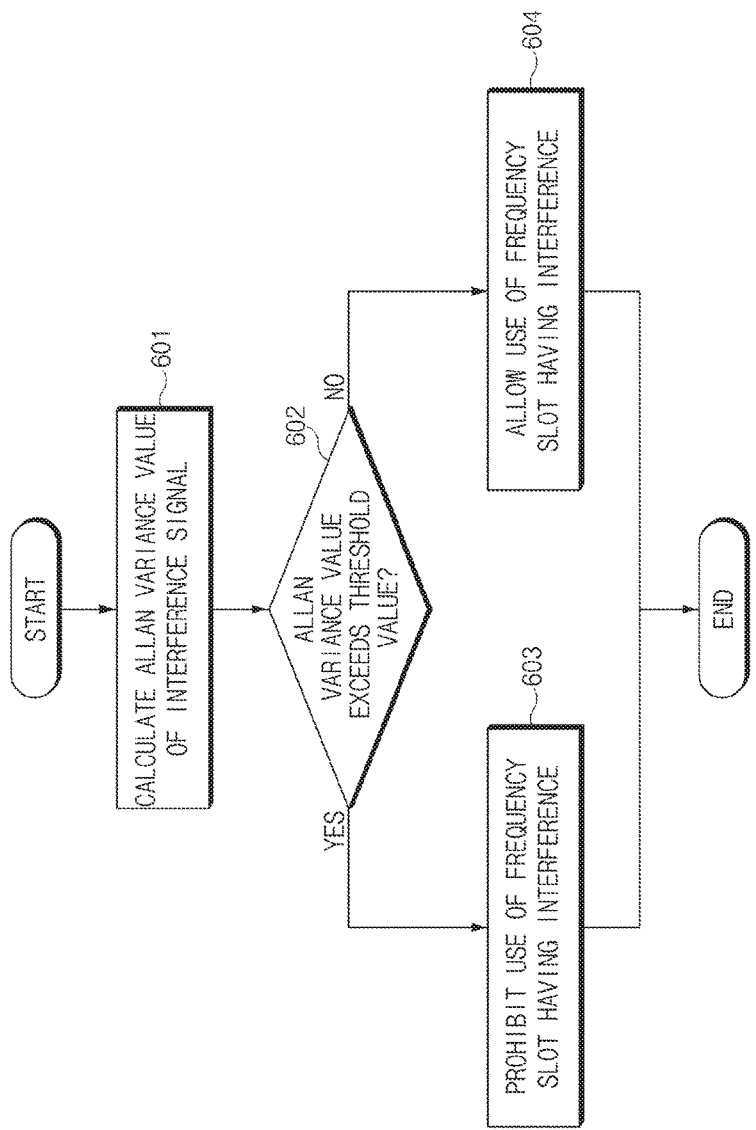
FIG. 6 is a flowchart illustrating an operation of a signal estimator, according to an exemplary embodiment of the present disclosure.

FIG. 6 is a flowchart illustrating an operation of the signal estimator, according to an exemplary embodiment of the present disclosure.

First, the signal estimator 52 calculates an Allan variance value of an interference signal generated from a heterogeneous short range radio communication device (601).

Thereafter, the signal estimator 52 determines whether the calculated Allan variance value exceeds a threshold value (602).

If the Allan variance value exceeds the threshold value as the result of the determination in operation 602, the signal estimator 52 prohibits the use of the frequency band having the narrow band interference (603).

If the Allan variance value does not exceed the threshold value as the result of the determination in operation 602, the signal estimator 52 allows the use of the frequency band having the narrow band interference (604).

The operation of the signal estimator 52 may be performed by the controller 53.

While the present invention has been described with reference to exemplary embodiments, it will be apparent to those skilled in the art that various changes and modifications may be made without departing from the spirit and scope of the present invention.

Therefore, exemplary embodiments of the present invention are not limiting, but illustrative, and the spirit and scope of the present invention is not limited thereto. The spirit and scope of the present invention should be interpreted by the following claims, and it should be interpreted that all technical ideas which are equivalent to the present invention are included in the spirit and scope of the present invention.

What is claimed is:

1. A communication method between short range radio communication devices, the communication method comprising steps of:
    sharing multiple pieces of link information of multiple devices, by the multiple devices making communication with each other through a frequency hopping scheme under a short range radio communication environment;
    creating multiple pieces of frequency slot allocation information based on the multiple pieces of link information and broadcasting the multiple pieces of created frequency slot allocation information, by each of the multiple devices; and
    making, by the multiple devices, first communication based on specific frequency slot allocation information among the multiple pieces of received frequency slot allocation information.

2. The communication method of claim 1, wherein the step of creating the multiple pieces of frequency slot allocation information:
    includes equally distributing, by the multiple devices, frequency slots in random sequence.

3. The communication method of claim 1, wherein the frequency slot allocation information includes:
    information on time at which the frequency slot allocation information is created.

4. The communication method of claim 3, wherein the step of making the first communication includes:
    selecting, by the multiple devices, frequency slot allocation information, which represents earliest time information, among the multiple pieces of received frequency slot allocation information;
    agreeing, by the multiple devices, on use of the selected frequency slot allocation information; and
    communicating, by the multiple devices, according to the selected frequency slot allocation information.

5. The communication method of claim 1, wherein the frequency slot allocation information includes:
    information on time at which the frequency slot allocation information is broadcasted.

6. The communication method of claim 5, wherein the step of making the first communication includes:
    selecting, by the multiple devices, frequency slot allocation information, which represents earliest time information among the multiple pieces of received frequency slot allocation information;
    agreeing, by the multiple devices, on use of the selected frequency slot allocation information; and
    communicating, by the multiple devices, according to the selected frequency slot allocation information.

7. The communication method of claim 1, wherein the specific frequency slot allocation information includes:
    information representing valid time of the specific frequency slot allocation information.

8. The communication method of claim 7, further comprising a step of:
    re-creating frequency slot allocation information, if the valid time elapses, by a device, which has created the specific frequency slot allocation information, after the first communication is made.

9. The communication method of claim 8, wherein the step of re-creating the frequency slot allocation information includes:
    if the device, which has created the specific frequency slot information, deviates from a coverage area for short range radio communication, sharing, by remaining devices among the multiple devices, multiple pieces of link information of the remaining devices;

re-creating and broadcasting multiple pieces of frequency slot allocation information; and communicating based on specific frequency slot allocation information among the multiple pieces of re-created frequency slot allocation information.

10. The communication method of claim 1, further comprising steps or:

after the first communication is made, determining a type of interference caused by a device (first device), which is located closest to a heterogeneous short range radio communication device, among the multiple devices as the heterogeneous short range radio communication device approaches;

broadcasting, by the first device, a signal, which is used for instructing exchange of the link information, to devices surrounding the first device, re-creating and broadcasting, by the multiple devices, multiple pieces of frequency slot allocation information, and making, by the multiple devices, second communication based on specific frequency slot allocation information among the multiple pieces of re-created frequency slot allocation information, if a wide band interference is caused; and broadcasting, by the first device, a signal, which is used for instructing use of a signal estimator, to the surrounding devices and determining, by the multiple devices, whether to use a frequency band having a narrow band interference by using the signal estimator, if the narrow band interference is caused.

11. The communication method of claim 10, wherein the step of determining the type of the interference includes:

determining the wide band interference to be present if the interference occurs beyond a reference frequency band; and determining the narrow band interference to be present if the interference occurs within the reference frequency band.

12. The communication method of claim 10, wherein the signal, which is used for instructing the exchange of the link information includes:

information on a frequency band having an interference caused by the heterogeneous short range radio communication device.

13. The communication method of claim 12, wherein the step of making the second communication includes:

re-creating, by the multiple devices, the frequency slot allocation information while avoiding the frequency band having the interference.

14. The communication method of claim 10, wherein the step of determining the type of the interference includes:

calculating an Allan variance value of an interference signal;

prohibiting the use of the frequency band having the narrow band interference if the calculated Allan variance value exceeds a threshold value; and allowing the use of the frequency band having the narrow band interference if the Allan variance value does not exceed the threshold value.

15. The communication method of claim 14, wherein the step of determining the type of the interference further includes:

making the second communication if the calculated Allan variance value exceeds the threshold value for a reference period of time.

16. The communication method of claim 10, wherein the frequency slot allocation information includes:

information on time at which the frequency slot allocation information is re-created.

17. The communication method of claim 16, wherein the step of making the second communication includes:

selecting, by the multiple devices, frequency slot allocation information, which represents earliest time information, among the multiple pieces of re-created frequency slot allocation information;

agreeing on use of the selected frequency slot allocation information by the multiple devices; and making, by the multiple devices, communication based on the selected frequency slot allocation information.

18. The communication method of claim 10, wherein the frequency slot allocation information includes:

information on time at which the frequency slot allocation information is broadcasted.

19. The communication method of claim 18, wherein the step of making the second communication includes:

selecting, by the multiple devices, frequency slot allocation information, which represents earliest time information, among the multiple pieces of re-created frequency slot allocation information;

agreeing, by the multiple devices, on use of the selected frequency slot allocation information; and making, by the multiple devices, communication based on the selected frequency slot allocation information.

* * * * *